United States Patent [19]

Fujikawa

[11] 4,404,945
[45] Sep. 20, 1983

[54] FUEL-SUPPLY CONTROL SYSTEM FOR GAS-TURBINE ENGINE

[75] Inventor: Yasuo Fujikawa, Yokohama, Japan

[73] Assignee: Nissan Motor Company, Limited, Yokohama, Japan

[21] Appl. No.: 290,076

[22] Filed: Aug. 4, 1981

[30] Foreign Application Priority Data

Oct. 21, 1980 [JP] Japan .................................. 55-146238

[51] Int. Cl.³ .............................................. F02B 3/00
[52] U.S. Cl. .................................... 123/478; 123/434
[58] Field of Search ............... 123/478, 434; 60/39.28, 60/39.74

[56] References Cited

U.S. PATENT DOCUMENTS

| | | | |
|---|---|---|---|
| 3,669,081 | 6/1972 | Monpetit | 123/478 |
| 3,688,750 | 9/1972 | O'Neill | 123/478 |
| 3,786,789 | 1/1974 | Barr et al. | 123/478 |
| 4,069,800 | 1/1978 | Kanda et al. | 123/478 |
| 4,256,075 | 3/1981 | Fukui et al. | 123/478 |
| 4,269,156 | 5/1981 | Drellishak | 123/478 |
| 4,336,782 | 6/1982 | Endo et al. | 123/478 |

*Primary Examiner*—Raymond A. Nelli
*Attorney, Agent, or Firm*—Schwartz, Jeffery, Schwaab, Mack, Blumenthal & Koch

[57] ABSTRACT

A fuel-supply control system for a gas-turbine engine includes a fuel injector opening into an engine combustion chamber, and a reservoir connected to the fuel injector. At least two different lines are each connected at one end to the reservoir. These lines are permitted to pass fuel therethrough to supply the fuel to the combustion chamber via the reservoir and the fuel injector. Metering valves whose number is equal to the number of the lines are arranged each in the lines in such a manner that the lengths of the lines from the corresponding metering valve to the reservoir are different from each other. The metering valves are changed from one of open and closed states to the other when energized. A sensor is provided for detecting a certain engine operating condition. A controller is connected to the sensor for producing a pulse train whose duty cycle depends on the engine operating condition. The pulse train is fed to the metering valves to open them periodically.

10 Claims, 1 Drawing Figure

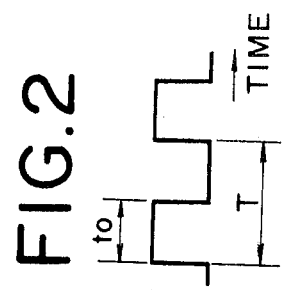
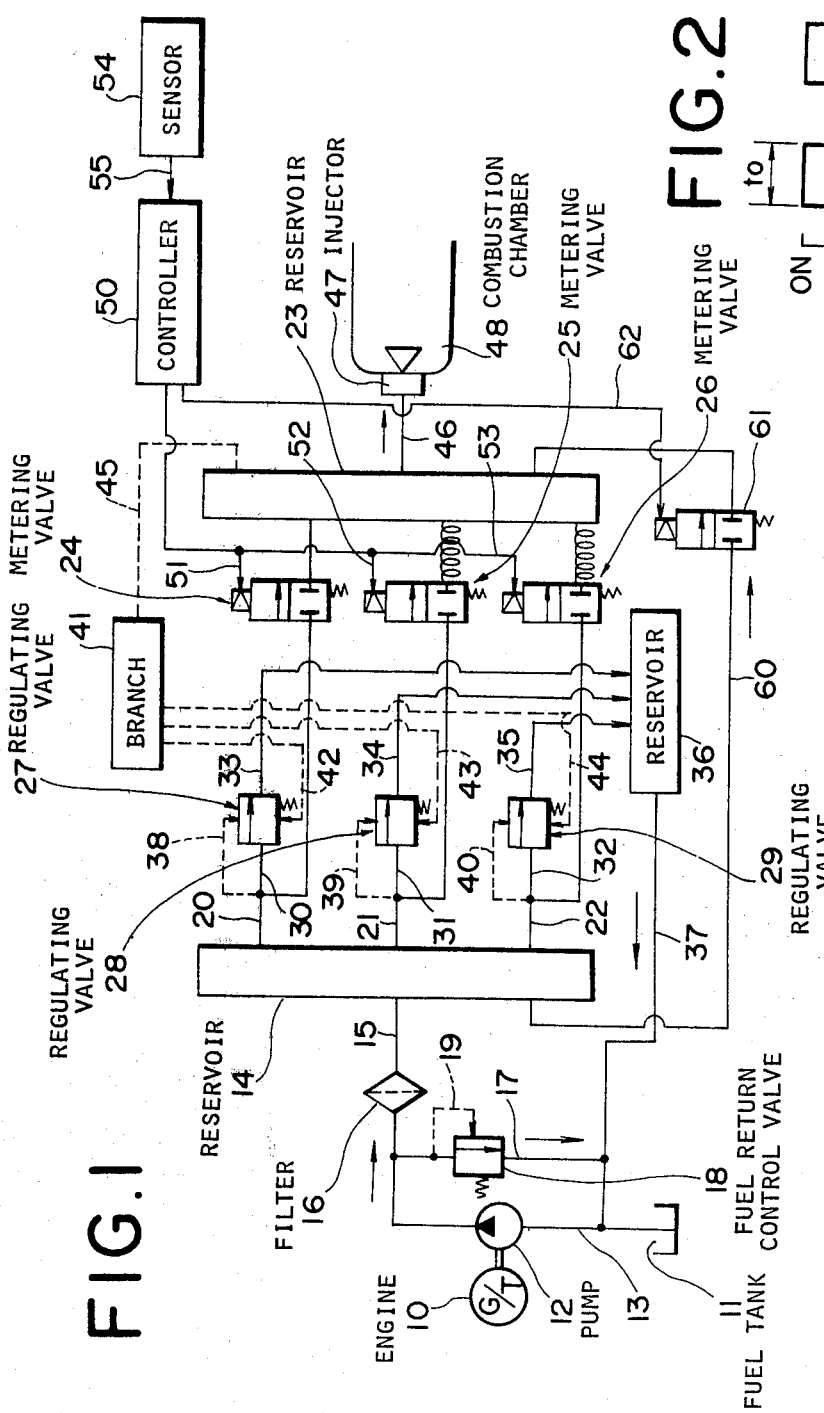

FUEL-SUPPLY CONTROL SYSTEM FOR GAS-TURBINE ENGINE

BACKGROUND OF THE INVENTION

1. Field of the Invention

This invention relates to a fuel-supply control system for a gas-turbine engine, wherein fuel-metering valves are driven by an electric pulse train so as to open periodically while the duty cycle of the pulse train is varied with a certain engine operating condition so that the amount of fuel supplied to the engine responds to the engine operating condition.

2. Description of the Prior Art

In a known fuel-supply control system for a gas-turbine engine, a fuel-metering valve controls the amount of fuel injected into the engine combustion chamber through a fuel injector. When the control valve opens, fuel flows therethrough to be injected through the injector. Since a pressure regulator controls the fuel pressure so as to keep the fuel flow rate constant when the control valve is open, the amount of fuel injected is proportional to the time during which the control valve is open (the time is hereinafter referred to as an open time of the valve). Generally, the control valve is of the electrically-driven type which opens when energized, and is driven by an electric pulse train so as to open periodically. Thus, the amount of fuel injected per a unit time, or the time-averaged fuel injection rate, depends on the duty cycle of the pulse train corresponding to the time rate of the control valve being open. Meanwhile the duty cycle of the pulse train is varied with a certain engine operating condition, such as a power required from the engine (hereinafter referred to as an engine required power) or an engine load so that the amount of fuel injected per a unit time responds to the engine operating condition.

When the engine is operated under constant conditions, such a fuel-supply control system may produce therein relatively large fuel pressure pulsations. Each opening of the control valve causes a fuel pressure pulsation, which travels back and forth within the system like a wave until being completely damped. In the above constant conditions, the control valve usually opens periodically at a constant frequency for a constant time, so that the fuel pressure pulsations may interfere with each other to form relatively large fuel pressure pulsations. The resultant large fuel pressure pulsations severely disturb the regulated pressure of the fuel injected, thereby lowering the stability of the accuracy of the control of the amount of fuel injected per a unit time.

SUMMARY OF THE INVENTION

It is an object of the present invention to provide a fuel-supply control system for a gas-turbine engine, which can prevent the occurrence of relatively large fuel pressure pulsations and thus has an adequate stability and accuracy of the fuel-supply control.

The fuel-supply control system of the present invention used in a gas-turbine engine includes a fuel injector opening into an engine combustion chamber, a reservoir connected to the fuel injector, and at least two different lines each connected at one end to the reservoir. These lines are permitted to pass fuel therethrough to supply the fuel to the combustion chamber via the reservoir and the fuel injector. Metering valves whose number is equal to the number of the lines are arranged one in each of the lines in such a manner that the lengths of the lines from each metering valve to the reservoir are different from each other. The metering valves are changed from one of open and closed states to the other when energized. A sensor is provided to detect a certain engine operating condition. A controller is connected to the sensor to produce a pulse train whose duty cycle depends on the engine operating condition. The pulse train is fed to the metering valves to open them periodically.

The above and other objects, features and advantages of the present invention will be apparent from the following description of a preferred embodiment thereof, taken in conjunction with the drawings.

BRIEF DESCRIPTION OF THE DRAWING

FIG. 1 is a diagrammatic view of a fuel-supply control system of the present invention; and FIG. 2 is a timing chart of the status of the metering valve shown in FIG. 1.

DESCRIPTION OF THE PREFERRED EMBODIMENT

With reference to FIG. 1, there is shown a fuel-supply control system for a gas-turbine engine 10, which has a fuel tank 11 and a fuel feed pump 12. The inlet of the pump 12 is connected to the tank 11 through a line 13 to suck fuel from the tank 11. The pump 12 is driven by the engine 10. The outlet of the pump 12 is connected to an upstream reservoir 14 through a line 15 to feed the fuel into the upstream reservoir 14. A fuel filter 16 is disposed in the line 15 to remove dirt from the fuel fed into the upstream reservoir 14. A fuel return line 17 is connected at one end to the line 15 upstream of the fuel filter 16 but downstream of the pump 12 and at its other end to the line 13 leading to the tank 11. In the line 17 is disposed a fuel return control valve 18 with a control inlet, which increases the degree of opening thereof when the pressure applied to the control inlet rises. A control line 19 is connected at one end to the control inlet of the fuel return control valve 18 and at its other end to the line 17 upstream of the valve 18 to apply the fuel pressure downstream of the pump 12 to the control inlet. When the fuel pressure downstream of the pump 12 rises, the fuel return control valve 18 thus increases the amount of fuel returned from the pump 12 to the tank 11 through the lines 17 and 13 to regulate the pressure of the fuel fed to the upstream reservoir 14.

The upstream reservoir 14 is of an elongated form whose circular or rectangular cross-sectional area is constant or unchanged in the lengthwise direction thereof. The line 15 is connected to the upstream reservoir 14 at the center of one side of the reservoir 14. Ends of lines 20 and 22 are connected to the upstream reservoir 14 at the opposite ends of the side of the reservoir 14 remote from the line 15. Additionally one end of a line 21 is connected to the reservoir 14 at the center of the same side of the reservoir 14. The other ends of the lines 20, 21, and 22 are connected to a downstream reservoir 23 at one end, the center, and the other end of one side of the reservoir 23 respectively. The downstream reservoir 23 is of a similar form to the upstream reservoir 14. Metering valves 24, 25, and 26 are arranged in the lines 20, 21, and 22 respectively to control the flow of fuel from the reservoir 14 to the reservoir 23 through the lines 20, 21, and 22. These metering valves 24, 25, and 26 are of the electrically-driven type having only two states, open or closed, or on or off, being open when energized.

Regulating valves 27, 28, and 29 are provided to keep constant the differences between the pressures upstream of the metering valves 24, 25, and 26 and the pressure in the downstream reservoir 23, effectively the pressures across the metering valves 24, 25, and 26. The inlets of the regulating valves 27, 28, and 29 are connected to the line 20, 21, and 22 respectively upstream of the metering valves 24, 25, and 26 by means of lines 30, 31, and 32 respectively. The outlets of the regulating valves 27, 28, and 29 are connected by means of lines 33, 34, and 35 respectively to a reservoir tank 36, which is in turn connected to the fuel tank 11 by means of a line 37 leading to the line 17 downstream of the fuel return control valve 18. The first control inlets of the regulating valves 27, 28, and 29 are connected to the line 20, 21, and 22 respectively upstream of the metering valves 24, 25, and 26 by means of lines 38, 39, and 40 respectively, to introduce thereinto the fuel pressure upstream of the valves 24, 25, and 26 respectively. The second control inlets of the regulating valves 27, 28, and 29 are connected to a branch unit 41 by means of lines 42, 43, and 44 respectively. The branch unit 41 is connected by means of a line 45 to the downstream reservoir 23 at one end of the side of the reservoir 23 remote from the lines 20, 21, and 22, to introduce the fuel pressure in the reservoir 23 into the second control inlets of the regulating valves 27, 28, and 29. Each of the regulating valves 27, 28, and 29 varies its degree of opening in response to the difference between the pressures applied to the first and second control inlets thereof. When the difference between the fuel pressure in the line 20, 21, or 22 upstream of the metering valve 24, 25, or 26 respectively and that in the downstream reservoir 23 rises above a preset value, the regulating valve 27, 28, or 29 increases the amount of fuel returned to the fuel tank 11 through the line 33, 34, or 35 respectively, the reservoir tank 36, the lines 37, 17 and 13 to reduce the difference in pressure to the present value. On the other hand, when the difference in pressure drops below the preset value, the regulating valve 27, 28, or 29 reduces the amount of fuel returned to raise the difference in pressure to the preset value. Thus, the difference between the fuel pressures in the line 20, 21, or 22 upstream of the metering valve 24, 25, or 26 respectively and that in the downstream reservoir 23, or the pressure across the metering valve 24, 25, or 26 is maintained at the preset value, so that the amount of fuel flowing through the metering valve 24, 25, or 26 is proportional to an open time of the valve 24, 25, or 26 (or the time during which the valve is open).

One end of a line 46 is connected to the downstream reservoir 23 at the center of the side of the reservoir 23 remote from the lines 20, 21, and 22, the other end being connected to an injector 47 opening into an engine combustion chamber 48. When the metering valve 24, 25, or 26 opens, the fuel flows therethrough and then through the downstream reservoir 23, the line 46, and the injector 47 to be supplied to the chamber 48 and thus to the engine.

A controller 50 produces and feeds a pulse train as a drive signal to the control terminals of the metering valves 24, 25, and 26 through leads 51, 52, and 53 respectively to open them periodically. The metering valves 24, 25, and 26 open simultaneously when they receive pulses of the drive signal. Since the amount of fuel flowing through the metering valves 24, 25, and 26 is proportional to an open time thereof, the amount of fuel supplied to the engine per a unit time depends on the duty cycle of the drive signal. A sensor 54 detects a certain engine operating condition, such as an engine required power or an engine load and feeds its output signal to the control terminal of the controller 50 through a lead 55. The controller 50 changes the duty cycle of the drive signal in response to the output signal from the sensor 54 so that the amount of fuel supplied to the engine per a unit time will vary with the engine required power or the engine load. The controller 50 includes an astable multivibrator outputting a constant-frequency pulse train whose pulse-width can be varied with the voltage applied to the control terminal thereof, while the sensor 54 is adapted to output a voltage signal varying with the engine required power or the engine load. Receiving the drive signal, each metering valve 24, 25, or 26 switches between on and off as shown in FIG. 2, where the time $t_o$ corresponds to an open time of the metering valve; the time T corresponds to a single cycle of the drive signal; and thus the ratio $t_o/T$ corresponds to the duty cycle of the drive signal.

One end of a line 60 is connected to the upstream reservoir 14 at one end of the side of the reservoir 14 closer to the line 15, the other end of the line 60 being connected to the downstream reservoir 23 at the end of the side, remote from the line 45, of the reservoir 23 close to the line 46. In the line 60 is arranged a valve 61 of the electrically-driven type having only two states, on or off, or open or closed, being open when energized. The controller 50 additionally includes a differentiator differentiating the output signal from the sensor 54, and a comparator comparing the differentiated signal with a preset reference voltage so as to be on when the engine required power or the engine load falls at a speed greater than a preset value. The output signal from the comparator is fed to the control terminal of the valve 61 through a lead 62 to control the valve 61. When the output signal from the comparator is on, the valve 61 opens to supply fuel to the combustion chamber 48 through the upstream reservoir 14, the line 60, the downstream reservoir 23, the line 46, and the injector 47. The preset values for the falling speed of the engine required power or the engine load and the amount of fuel flowing through the valve 61 are so designed that a amount of fuel sufficient to prevent misfires in the combustion chamber 48 is supplied through the valve 61 to the combustion chamber 48 when the amount of fuel supplied through the metering valves 24, 25, and 26 to the combustion chamber 48 is reduced to near zero so rapidly that misfires may occur in the combustion chamber 48, according to the fall in the engine required power or the engine load.

The metering valves 24, 25, and 26, and the lines 20, 21, and 22 are so arranged that the effective lengths of the lines 20, 21, and 22 from the upstream reservoir 14 to the metering valves 24, 25, and 26 respectively are different from each other, and that the effective lengths of the lines 20, 21, and 22 from the downstream reservoir 23 to the metering valves 24, 25, and 26 respectively are different from each other. Thus, the first series of fuel pressure pulsations caused by the opening and closing of the first metering valve 24, the second series caused by the second valve 25, and the third series caused by the third valve 26 travel like waves and enter the reservoirs 14 and 23 through the lines 20, 21, and 22 respectively at different phase angles from each other although they occur simultaneously with each other. The inner volume, the length, and cross-sectional area of the reservoirs 14 and 23 are large enough so that the introduced fuel pressure pulsations tend to stay therein, and consequently the first, second, and third series of fuel pressure pulsations interfere with each other so as to be damped in the reservoir 14 or 23, because they have different phases when entering the reservoir 14 or 23. Thus, even when the engine is operated under constant conditions where the metering valves 24, 25, and 26 open periodically at a constant frequency for a constant time and thus cause constant-frequency fuel pressure pulsations, no relatively large fuel pressure pulsations occur.

If the downstream reservoir 23 is not provided and the lines 20, 21, and 22 are connected in common to the line 46, the first, second, and third series of pressure pulsation waves of fuel caused by the first, second, and third metering valves 24, 25, and 26 respectively do not interfere with each other so as to be damped and directly enter the injector 47. In conclusion, a combination of the downstream reservoir 23 and the different lengths of the lines 20, 21, and 22 from the reservoir 23 to the metering valves 24, 25, and 26 respectively can effectively prevent the occurrence of relatively large fuel pressure pulsations entering the injector 47. In practice, to achieve the foregoing different-length arrangement, the lines 20, 21 and 22 from the reservoir 23 to the corresponding metering valves 24, 25 and 26 are substantially straight, helical, and helical with a number of turns about its axis greater than that of the line 21, respectively.

It should be noted that all of the lines in FIG. 1 consist of passages, conduits, hoses, or the like. It should be understood that further modifications and variations may be made in the present invention without departing from the spirit and scope of the present invention as set forth in the appended claims.

What is claimed is:

1. A fuel-supply control system for a gas-turbine engine, comprising:
   (a) a fuel injector opening to an engine combustion chamber;
   (b) a reservoir connected to the fuel injector;
   (c) at least two different lines each connected at one end to the reservoir, the lines being permitted to pass fuel therethrough to supply the fuel to the combustion chamber through the reservoir and the fuel injector;
   (d) metering valves whose number is equal to the number of the lines and which are arranged in the lines respectively in such a manner that the lengths of the lines from the corresponding metering valve to the reservoir are different from each other, the metering valves being changed from one of open and closed states to the other when energized;
   (e) a sensor detecting an engine operating condition; and
   (f) a controller electrically connected to the sensor for receiving the output signal from the sensor indicative of the engine operating condition, the controller producing a pulse train whose duty cycle responds to the engine operating condition and feeding the pulse train to the metering valves to open them periodically.

2. A fuel-supply control system as defined in claim 1, wherein the reservoir is of an elongated form and the number of the lines containing metering valves is three, one of the lines, the first line, being connected to the reservoir at the center of one side of the reservoir, the other two lines, the second and third lines, being connected to the reservoir at the opposite ends of the foregoing side of the reservoir respectively.

3. A fuel-supply control system as defined in claim 2, wherein the first line is helical, the second line is straight, and the third line is helical with a number of turns about its axis greater than that of the first line, from the corresponding metering valve to the reservoir.

4. A fuel-supply control system as defined in claim 2, wherein the reservoir is connected to the fuel injector by means of a fourth line, the fourth line being connected to the reservoir at the center of the side of the reservoir remote from the other lines.

5. A fuel-supply control system as defined in claim 2, wherein the reservoir is constant in internal cross-sectional area along the lengthwise direction thereof.

6. A fuel-supply control system as defined in claim 1, further comprising a second reservoir supplied with fuel, the lines each being connected at the other end to the second reservoir for introducing therein the fuel from the second reservoir.

7. A fuel-supply control system as defined in claim 6, wherein the lengths of the lines from the second reservoir to the corresponding metering valve are different from each other.

8. A fuel-supply control system as defined in claim 7, wherein the second reservoir is of an elongated form and the number of the lines containing the corresponding valves is three, one of the lines being connected to the second reservoir at the center of one side of the second reservoir, the other two lines being connected to the second reservoir at the opposite ends of the foregoing side of the reservoir.

9. A fuel-supply control system as defined in claim 8, wherein the second reservoir is supplied with fuel through a fifth line connected to the second reservoir at the center of the side of the second reservoir remote from the other lines.

10. A fuel-supply control system as defined in claim 8, wherein the second reservoir is constant in internal cross-sectional area along the lengthwise direction thereof.

* * * * *